US010333204B2

(12) United States Patent
Jerez et al.

(10) Patent No.: US 10,333,204 B2
(45) Date of Patent: Jun. 25, 2019

(54) ANTENNA COMPONENT HAVING A MAGNETIC CORE AND A PLURALITY OF ELECTRICAL CONDUCTORS

(71) Applicant: EPCOS AG, Munich (DE)

(72) Inventors: Felipe Jerez, Elchingen (DE); Anneliese Drespling, Heidenheim (DE); Elmar Walter, Herbrechtingen (DE); Stephan Buehlmaier, Langenau (DE); Joern Schliewe, Steinheim (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 15/561,334

(22) PCT Filed: Mar. 29, 2016

(86) PCT No.: PCT/EP2016/056815
§ 371 (c)(1),
(2) Date: Sep. 25, 2017

(87) PCT Pub. No.: WO2016/156326
PCT Pub. Date: Oct. 6, 2016

(65) Prior Publication Data
US 2018/0083346 A1    Mar. 22, 2018

(30) Foreign Application Priority Data

Mar. 31, 2015  (DE) .................. 10 2015 104 993

(51) Int. Cl.
*H01Q 1/22* (2006.01)
*H01Q 1/32* (2006.01)
(Continued)

(52) U.S. Cl.
CPC ...... *H01Q 1/3241* (2013.01); *G06K 19/07773* (2013.01); *H01Q 1/2225* (2013.01); *H01Q 7/06* (2013.01); *H01Q 21/24* (2013.01)

(58) Field of Classification Search
CPC ...... H01Q 1/3241; H01Q 1/2225; H01Q 7/06; G06K 19/07773
(Continued)

(56) References Cited

U.S. PATENT DOCUMENTS 7,042,411 B2 * 5/2006 Yagi .................. H01Q 7/06
343/787
9,795,829 B2 * 10/2017 Hartmann ............ H01Q 1/2216
(Continued)

FOREIGN PATENT DOCUMENTS

| CN | 202977699 U | 6/2013 |
|----|-------------|--------|
| JP | H06247774 A | 9/1994 |

(Continued)

OTHER PUBLICATIONS

Ferroxcube, "4B2 Material Specification," XP055277839, URL: http://www.ferroxcube.com/FerroxcubeCorporateReception/datasheet/4b2.pdf, Specifications, Sep. 1, 2008, 4 pages.
(Continued)

Primary Examiner — Lam T Mai
(74) Attorney, Agent, or Firm — Slater Matsil, LLP (57) ABSTRACT

An antenna component is disclosed. In an embodiment the antenna component including a first, second and third electrical conductors and a magnetic core integrally embodied having different section, wherein the first, second and third electrical conductors are located at different sections of the magnetic core.

16 Claims, 9 Drawing Sheets

(51) Int. Cl.
*H01Q 7/06* (2006.01)
*H01Q 21/24* (2006.01)
*G06K 19/077* (2006.01)

(58) Field of Classification Search
USPC .......................................................... 343/711
See application file for complete search history.

(56) References Cited

U.S. PATENT DOCUMENTS

| | | |
|---|---|---|
| 2005/0083242 A1 | 4/2005 | Yagi et al. |
| 2006/0152427 A1 | 7/2006 | Ueda et al. |
| 2007/0091009 A1 | 4/2007 | Lueg-Althoff et al. |
| 2008/0036672 A1 | 2/2008 | Ueda et al. |
| 2013/0033408 A1 | 2/2013 | Miki et al. |
| 2016/0373867 A1* | 12/2016 | Ozden .................... H04R 25/02 |
| 2017/0026762 A1* | 1/2017 | Ruaro .................. H04R 25/554 |

FOREIGN PATENT DOCUMENTS

| | | |
|---|---|---|
| JP | 2004228043 A | 8/2004 |
| JP | 2006080107 A | 3/2006 |
| JP | 2006245044 A | 9/2006 |
| JP | 2006282412 A | 10/2006 |
| JP | 2013165368 A | 8/2013 |
| WO | 2014072075 A1 | 5/2014 |

OTHER PUBLICATIONS

TSC International: "TSC International—Catalog (Soft Ferrite Cores, Iron Powder Cores, Magnetic Laminations," XP055278085, URL: http://www.tscinternational.com/tsc-catalog.pdf, Ferrite Manufacturing Overview; pp. 4-4, pp. 8-8; Tabelle Soft Ferrite Material Constants, Jan. 1, 2007, 88 pages.

* cited by examiner

ANTENNA COMPONENT HAVING A MAGNETIC CORE AND A PLURALITY OF ELECTRICAL CONDUCTORS

This patent application is a national phase filing under section 371 of PCT/EP2016/056815, filed Mar. 29, 2016, which claims the priority of German patent application 10 2015 104 993.7, filed Mar. 31, 2015, each of which is incorporated herein by reference in its entirety.

TECHNICAL FIELD

The invention relates to an antenna component which can be used, in particular, in a receiver of a passive access authorization system and/or a passive authorization system for starting an engine, for example, of a vehicle.

BACKGROUND

In the last few years, various technologies have been developed for wireless access systems in automotive applications which permit passive access to the vehicle and passive starting of the vehicle. Such systems use low-frequency antenna systems which are provided in a transmitter unit in the vehicle and in a receiver unit of a radio key. An antenna which is integrated in the receiver unit must ensure the reception of signals in all three spatial directions.

SUMMARY OF THE INVENTION

One possibility is to provide a separate antenna for each spatial direction in the receiver unit. However, this solution is costly and requires a large amount of space. In addition to the requirement for antennas of a small design and with low cost, in the last few years the requirements which are made of the physical properties of antennas for automotive applications have also increased continuously. The antennas are to be distinguished by a high level of sensitivity, that is to say, by high induced voltages for a given field and a large Q factor. Furthermore, they should be mechanically robust and may ensure a high level of reliability at low costs. For this purpose, in various embodiments, means of forming an electrical contact within the antenna structure may remain unaffected even under mechanical stress and short circuits between electrical conductors of the antenna may be avoided.

Embodiments provide an antenna component permitting signal reception in three spatial directions, and having good electrical and mechanical properties and can be operated reliably.

One embodiment of such an antenna component comprises a first, second and third electrical conductor and has a magnetic core for winding with the electrical conductors. The magnetic core is embodied integrally. It comprises a central cuboid section with an upper and lower rectangular side face, each with a first and second relatively long side and a first and second relatively short side. The first electrical conductor is wound directly around the central section of the magnetic core in such a way that the first electrical conductor runs parallel to the first and second relatively long sides of the upper and lower side faces of the central section of the magnetic core.

Furthermore, the magnetic core has a first and second lateral section. The first lateral section is arranged on a central part of the first relatively long side of the upper and lower side faces of the central section of the magnetic core. The second lateral section is arranged on a central part of the second relatively long side of the upper and lower side faces of the central section of the magnetic core. The second electrical conductor is wound directly around the first and second lateral section of the magnetic core in such a way that the second electrical conductor is arranged over the first electrical conductor and runs orthogonally with respect to the first electrical conductor.

The magnetic core also has a plurality of guide sections, each with a duct for guiding the third electrical conductor around the magnetic core. The guide sections are embodied in such a way that the third electrical conductor runs orthogonally with respect to the first and second electrical conductors.

The magnetic core is distinguished by a small component height. It has in cross section a rectangular profile with rounded or beveled edges. One of the guide sections is arranged at each corner of the rectangular profile. The guide sections are shaped in such a way that each of the guide sections has a duct for guiding the third electrical conductor around the circumference of the rectangular profile of the magnetic core. Owing to its profile, the core has in each case a guide/a duct for winding with the first electrical conductor in a y direction, for winding with the second electrical conductor in an x direction and for winding with the third electrical conductor in a z direction. The x, y and z directions are orthogonal with respect to one another. This ensures that the antenna component can receive and irradiate signals from the three spatial directions which are oriented orthogonally with respect to one another.

Figure 5A:
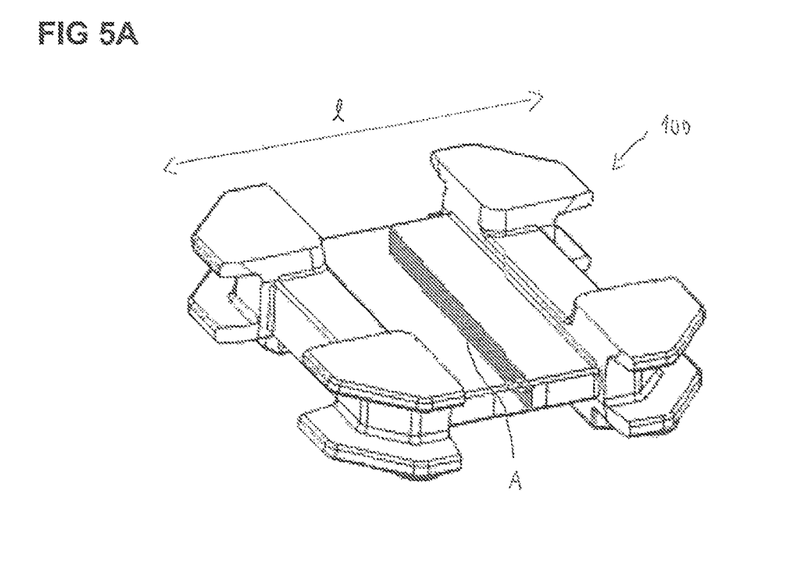
FIG. 5A shows an embodiment of a magnetic core of an antenna component with a large form factor.
Figure 5B:
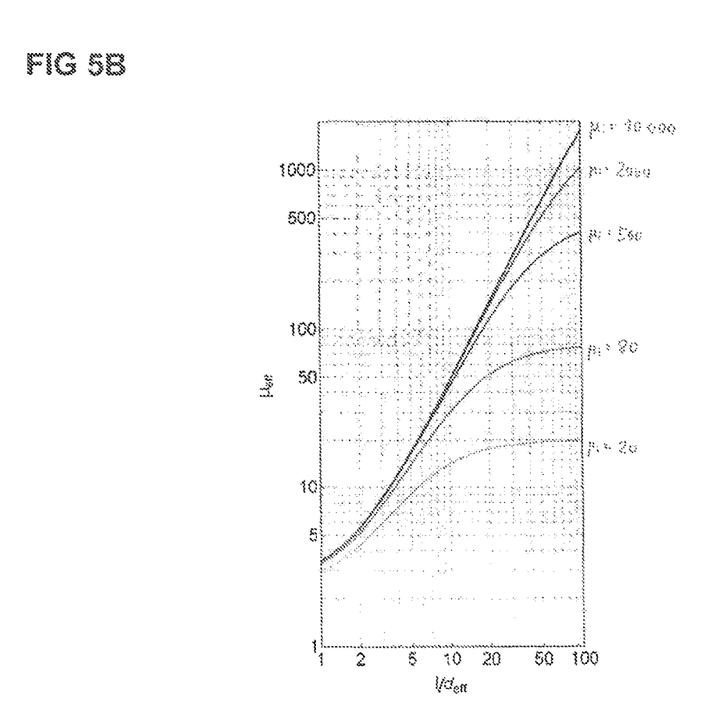
FIG. 5B shows a diagram with a permeability of the magnetic core with respect to the geometric shape of the core.

The ratio between the length of the magnetic core and a cross-sectional area of the magnetic core, in particular a cross-sectional area of the central section of the magnetic core which is perpendicular with respect to the longitudinal direction of the magnetic core, has a large value. As a result, the antenna component has a high effective permeability, as is shown in FIG. 5B, and a high sensitivity which can be, for the 6.75 mH type, for example, between 65 and 85 mV/µT.

The ferrite material of the magnetic core has a high density, for example, a density between 4600 kg/m$^3$ and 6000 kg/m$^3$ and a compressive strength between 200 N/mm$^2$ and 700 N/mm$^2$ in all the sections of the core. As a result, the core has good mechanical properties, in particular a high level of robustness. The magnetic core is manufactured by injection instead of the customary pressing of layers. As a result, the characteristic shape of the core with the different sections for winding with the first electrical conductor in the y direction, the second electrical conductor in the x direction and the third electrical conductor in the z direction can be obtained. As a result of the use of an injection process during the manufacture of the core, mechanical post-processing is no longer necessary and the core has a relatively high mechanical stability compared to a core which has been manufactured by pressing.

Wires composed of a high-temperature-stable material are used as the electrical conductors. The insulation of the electrical conductors can contain, for example, polyamide-imide, instead of polyurethane which is otherwise often used, or can be composed completely of polyamide-imide. The wires therefore have a high-temperature stable protective layer, for example, insulating layer.

BRIEF DESCRIPTION OF THE DRAWINGS

The invention will be explained in more detail below with reference to figures which show exemplary embodiments of the present invention. In the drawings.

DETAILED DESCRIPTION OF ILLUSTRATIVE EMBODIMENTS

Figure 1A:
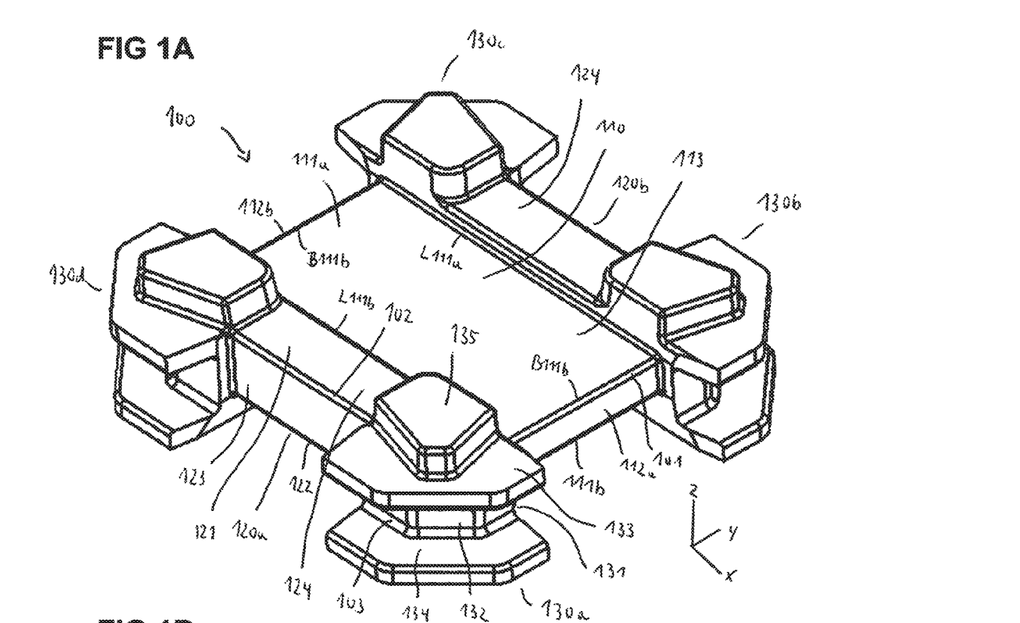
FIG. 1A shows an embodiment of a magnetic core of an antenna component.
Figure 1B:
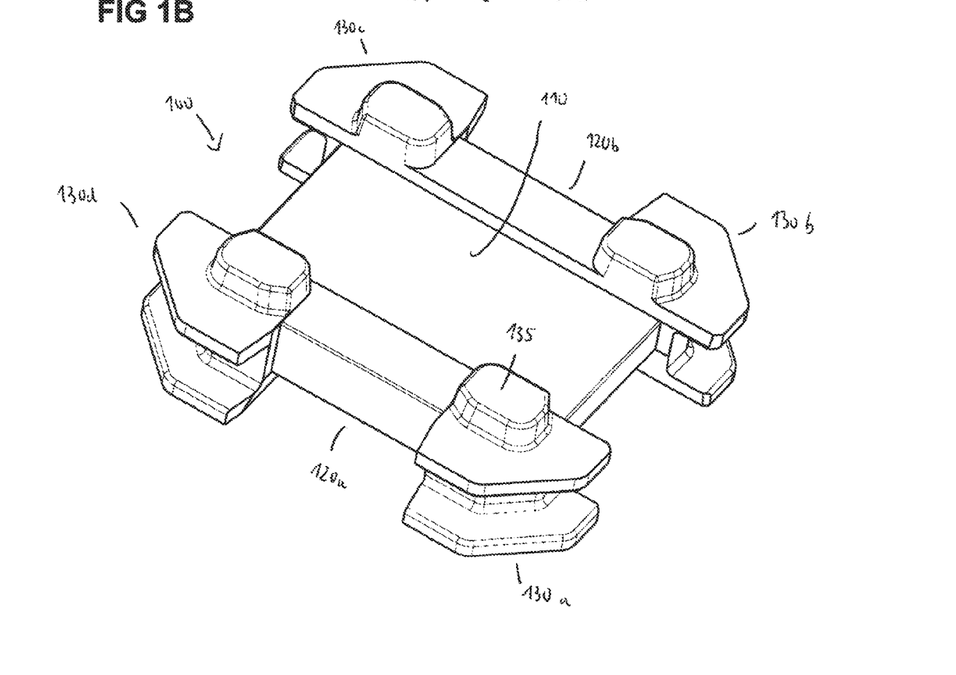
FIG. 1B shows a further embodiment of a magnetic core of an antenna component.
Figure 1C:
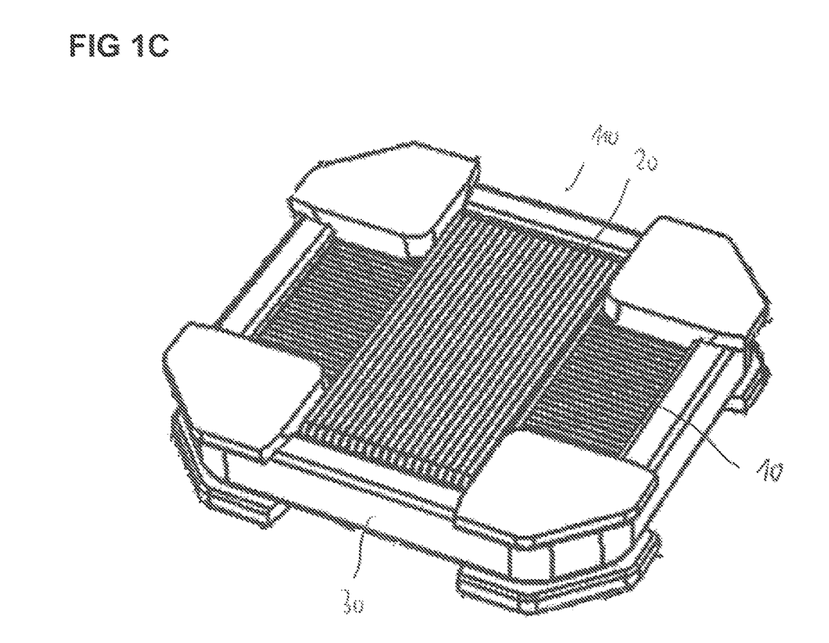
FIG. 1C shows an embodiment of an antenna component.

FIGS. 1A and 1B show a view of a first and second embodiment of a magnetic core 100 of an antenna component from an underside. In FIG. 1C, the magnetic core according to the configurations shown in FIGS. 1A and 1B is illustrated from an upper side. The magnetic core is wound with an electrical conductor 10, an electrical conductor 20 and an electrical conductor 30. The magnetic core 100 for winding with the electrical conductors 10, 20 and 30 is embodied as an integral or single-piece component. The electrical conductors are wound orthogonally with respect to one another, directly around the magnetic core 100.

The magnetic core 100 has a central cuboid section 110 with an upper rectangular side face 111a and a lower rectangular side face 111b, each with a relatively long side L111a and a relatively long side L111b lying opposite the latter, as well as a relatively short side B111a and a relatively short side B111b lying opposite the latter. As is illustrated in FIG. 1C, the electrical conductor 10 is wound directly around the central section 110 of the magnetic core in such a way that the electrical conductor 10 runs parallel to the relatively long sides L111a, L111b of the upper and lower side faces 111a, 111b of the central section 110 of the magnetic core 100.

The magnetic core 100 also has a lateral section 120a and a lateral section 120b. The lateral section 120a is arranged on a central part of the relatively long side L111a of the upper and lower side faces 111a, 111b of the central section 110 of the magnetic core. The lateral section 120b is arranged on the central part of the second relatively long side L111b of the upper and lower side faces 111a, 111b of the central section 110 of the magnetic core 100. The electrical conductor 20 is wound directly around the central section 120a and the lateral section 120b of the magnetic core 100 in such a way that the electrical conductor 20 is arranged over the electrical conductor 10 and runs orthogonally with respect to the electrical conductor 10, as is illustrated in FIG. 1C.

The magnetic core 100 also comprises guide sections 130a, 130b, 130c and 130d, each with a duct 131 for guiding the electrical conductor 30 around the magnetic core 100. The guide sections 130a, . . . , 130d are embodied in such a way that the electrical conductor 30 runs orthogonally with respect to the electrical conductors 10 and 20, as is illustrated in FIG. 1C. The electrical conductor 30 is arranged circumferentially around the magnetic core 100.

The central section 110 of the magnetic core 100 has, in addition to the upper and lower side faces 111a, 111b, a central side face 112a and a central side face 112b. The two central side faces 112a, 112b of the central section 110 of the magnetic core are arranged between the relatively short sides B111a, B111b of the upper and lower side faces 111a and 111b of the central section 110 of the magnetic core. The electric conductor 10 is wound directly around the upper and lower side faces 111a, 111b and the central side faces 112a, 112b, arranged between them, of the central section 110 of the magnetic core 100 and constitutes the winding in the y direction.

The two lateral sections 120a and 120b of the magnetic core each have an upper side faces 121 and a lower side face 122 as well as a central side face 123 which is arranged between them. The electrical conductor 20 is arranged directly on the respective upper side face 121, the central side face 123 and the lower side face 122 of the two lateral sections 120 of the magnetic core 100 and constitutes the winding in the x direction.

The upper side face 111a of the central section 110 of the magnetic core 100 is arranged parallel to the respective upper side face 121 of the two lateral sections 120a and 120b of the magnetic core. Likewise, the lower side face 111B of the central section 110 of the magnetic core 100 is arranged parallel to the respective lower side face 122 of the two lateral sections 120a and 120b of the magnetic core. A height of the magnetic core between the upper side face 111a and the lower side face 111b of the central section 110 of the magnetic core is less than a height of the magnetic core between the respective upper and lower side faces 121 and 122 of the lateral sections 120a, 120b of the magnetic core.

The guide sections 130a, . . . , 130d for guiding the electrical conductor 30 are arranged at the corners of the magnetic core 100 between, in each case, one of the lateral sections 120a, 120b of the magnetic core and the central side faces 112a, 112b of the central section 110 of the magnetic core. Each of the guide sections 130a, . . . , 130d has a duct 131 for guiding the electrical conductor 30. The respective duct 131 of the guide sections 130a, . . . , 130d of the magnetic core is shaped in such a way that the electrical conductor 30 is guided through the duct 131 around the corners of the magnetic core 100 and therefore around the circumference of the magnetic core.

According to one possible embodiment, each of the ducts 131 of the guide sections 130a, . . . , 130d has a base faces 132 and side walls 133 and 134 which are arranged laterally with respect thereto. The electrical conductor 30 is arranged directly on the base face 132 of the respective duct 131 of the guide sections 130a, . . . , 130d. The respective base face 132 of the ducts 131 of the guide sections 130a, . . . , 130d is shaped in such a way that the electrical conductor 30 is guided along the respective central side face 123 of the lateral sections 120a, 120b of the magnetic core around the corners of the magnetic core 100 and along the central side faces 112a, 112b of the central section 110 of the magnetic core.

The respective base face 132 of the ducts 131 of the guide device 130a, . . . , 130d is arranged in a plane over the respective central side face 123 of the lateral sections 120a, 120b of the magnetic core. Furthermore, the respective base face 132 of the ducts 131 of the guide device 130a, . . . , 130d is arranged in a plane over the central side faces 112a and 112b of the central section 110 of the magnetic core.

In the present antenna component, the magnetic core 100 has a ferrite material with a high density. The ferrite material has, for example, a density between 4600 kg/m$^3$ and 6000 kg/m$^3$ and a compressive strength between 200 N/mm$^2$ and 700 N/mm$^2$. Instead of the pressing of layers which is usually used for ferrite cores, the magnetic core of the antenna component is preferably manufactured by an injection method. The injection method permits the magnetic core to be fabricated with the configuration shown in FIG. 1A without mechanical processes, for example, grinding or polishing, being necessary for this purpose. As a result, the magnetic core is significantly mechanically more robust than magnetic cores which have been manufactured with a customary pressing method.

Using the injection method makes it advantageously possible to round edges 101 between the upper/lower side faces 111a/111b and the central side faces 112a, 112b of the magnetic core. Likewise, edges 102 between the respective side faces 121, 122 and 123 of the lateral sections 120a and 120b of the magnetic core are rounded. Furthermore, edges 103 between the respective base face 132 and the side walls 133, 134 of the ducts 131 of the guide sections 130a, . . . , 130d are embodied in a rounded fashion. Damage to the wire material of the electrical conductors can be avoided by avoiding sharp-edged junctions between the side faces during the winding of the central section 110 with the electrical conductor 10 and of the lateral sections 120a, 120b with the electrical conductor 20 and during the winding of the ducts 131 of the guide sections 130a, . . . , 130d with the electrical conductors 30.

Since the central section 110 and the sections 120a and 120b of the magnetic core which are arranged laterally thereon have different heights, a wide trench/duct 113 is formed for directly winding the central section 110 of the magnetic core with the electrical conductor 10. Likewise, a wide trench/duct 124 is also formed by the guide sections 130a, . . . , 130d arranged on the end faces of the lateral sections 120a and 120b of the magnetic core, for directly winding the lateral sections 120a and 120b with the electrical conductor 20. The guide devices 130a, . . . , 130d are themselves embodied in the form of ducts, wherein the duct/trench 131 which is formed as a result is narrower than the trenches 113 or 124. The trenches/ducts for the electrical conductors 10, 20 and 30 permit low inductive coupling between the three windings 10, 20 and 30 of the electrical conductors.

The side walls 133, 134 of the guide sections 130a, . . . , 130d are embodied in a particularly thin fashion, as a result of which the available space for winding the magnetic core with the electrical conductor 30 is enlarged. The side walls have, for example, a thickness of 0.3 mm to 0.6 mm, preferably a thickness of 0.4 mm. Owing to the high density of the material of the core, the guide sections 130a, . . . , 130d have good mechanical properties despite the thin side walls 133, 134, and are, in particular, sufficiently mechanically stable not to be damaged.

Figure 2A:
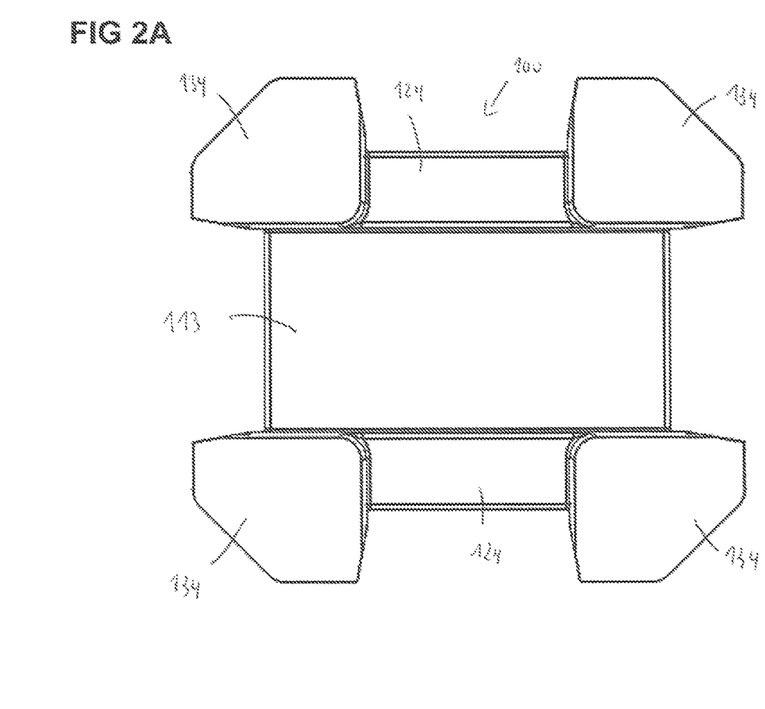
FIG. 2A shows a plan view of an upper side of a magnetic core of an antenna component.
Figure 2B:
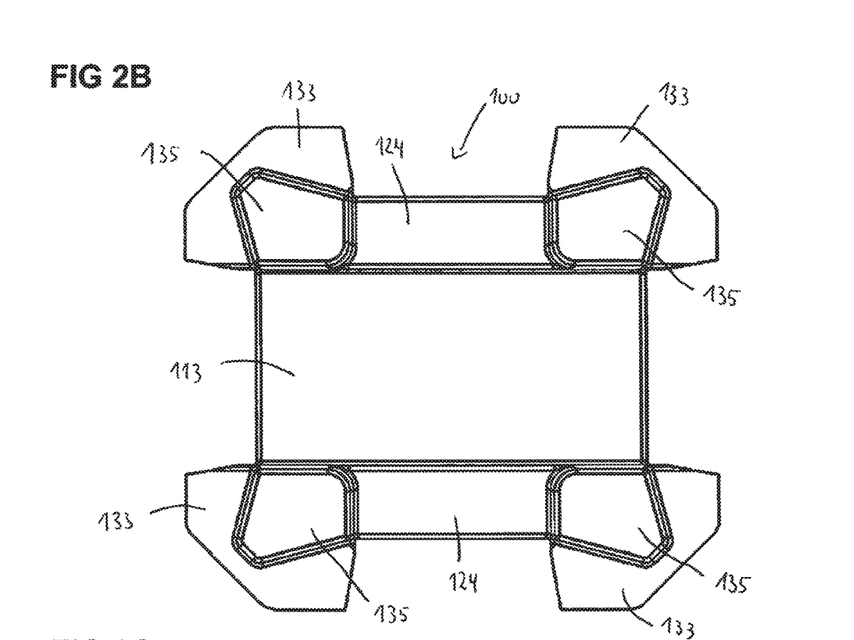
FIG. 2B shows a plan view of an underside of a magnetic core of an antenna component.
Figure 2C:
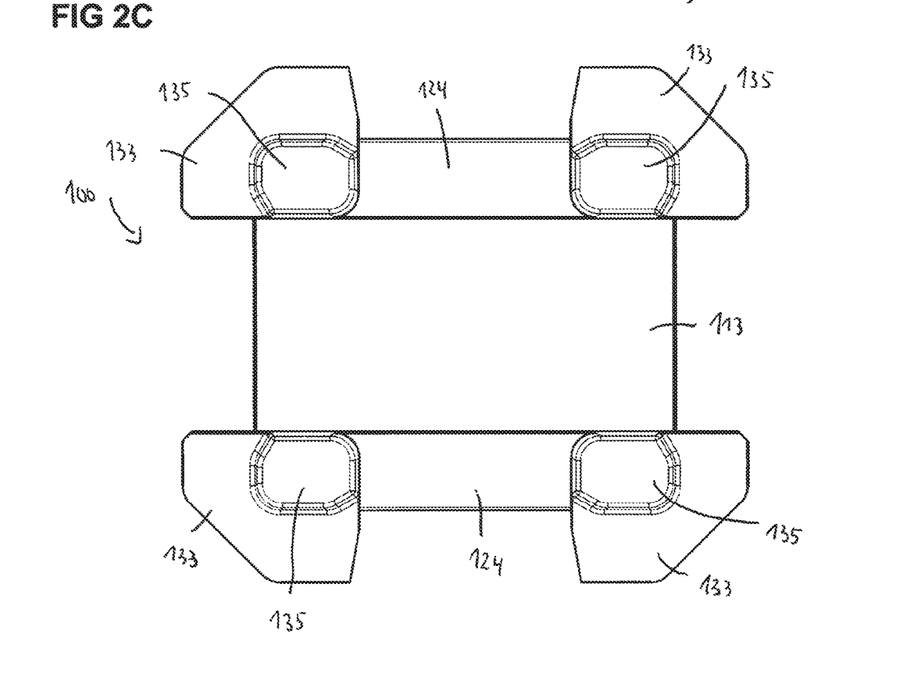
FIG. 2C shows a plan view of an underside of a further embodiment of a magnetic core of an antenna component.

FIG. 2A shows a plan view of an upper side of the unwound magnetic core 100. FIG. 2B shows a plan view of an underside of the unwound magnetic core 100 in FIG. 1A, and FIG. 2C shows a plan view of an underside of the unwound magnetic core 100 in FIG. 1B. The duct/trench 113 for winding the core with the electrical conductor 10 can be seen in the y direction, and the duct/trench 124 for winding the magnetic conductor in the x direction can be seen. As is apparent from FIGS. 2A, 2B and 2C, the magnetic core is not embodied symmetrically in the z direction. A projection 135 is arranged on each of the external side walls 133 of the ducts 131 of each of the guide sections 130a, . . . , 130d. The side walls 134 of the ducts 131 of the guide sections 130a, . . . , 130d do not have a projection but instead are constructed in a planar fashion on their external surface.

As is clear from a comparison of FIGS. 1A and 1B as well as of FIGS. 2B and 2C, the projections 135 in the embodiment shown in FIGS. 1A and 2B are embodied differently than in the embodiment shown in FIGS. 1B and 2C. In the embodiment of the core shown in FIGS. 1A and 2B, the projections have an approximately triangular outline in plan view, while the projections of the embodiment of the core shown in FIGS. 1B and 2C have an oval outline in a plan view. In the embodiment of the core shown in FIGS. 1A and 2B, the edges of the projections 135 run obliquely with respect to the side faces 123 and 112a, 112b, while the edges of the projections 135 in the embodiment of the core shown in FIGS. 1B and 2C run parallel to the side faces 123 and 112a, 122b. The technical significance of the projections 135 will be explained in more detail below with reference to FIGS. 5 and 6.

Figure 3:
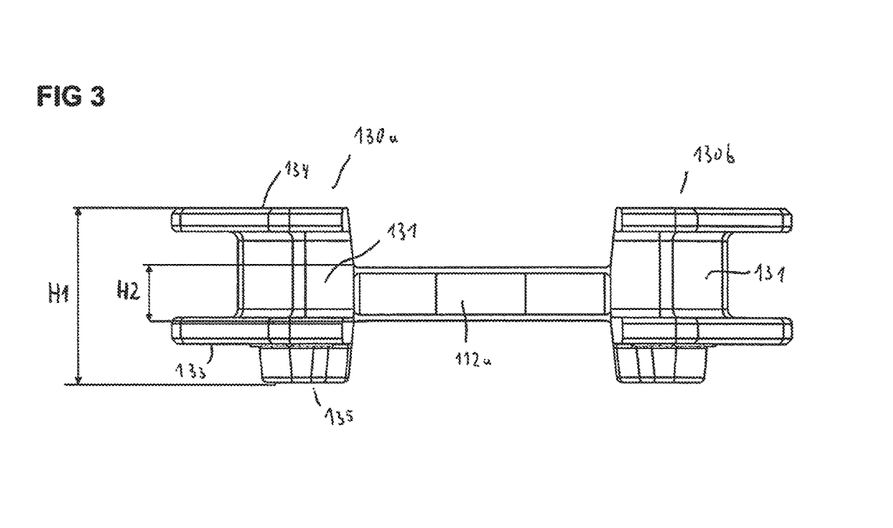
FIG. 3 shows a lateral view of an embodiment of a magnetic core of a magnetic component.

FIG. 3 shows a side view of the magnetic core 100 of the antenna component. The central section 110 of the magnetic core has, for example, a height B of 0.9 mm in the z direction. The guide sections 130a, . . . , 130d have, for example, a height A of 2.9 mm in the z direction. The magnetic core 100 is embodied in such a way that a ratio of the height A between the projection 135 of the magnetic core and the side wall 134 of each of the guide sections 130a, . . . , 130d and the height B between the upper and lower side faces 111a and 111b of the central section 110 of the magnetic core is at least greater than 3.

Figure 4:
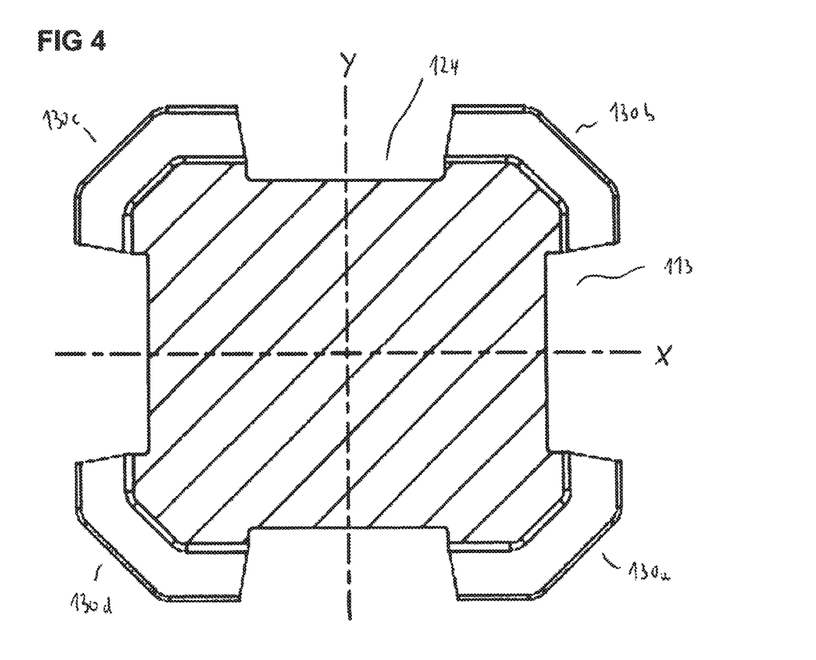
FIG. 4 shows a cross section through an embodiment of a magnetic core of an antenna component.

FIG. 4 shows a cross section through the magnetic core 100 of the antenna component. The trenches/ducts 113 and 124, which are arranged orthogonally with respect to one another and have the purpose of winding the magnetic core with the electrical conductors 10 and 20, and the duct/trench 131, running around the external circumference, for winding the magnetic core with the electrical conductor 30, are illustrated. The trenches are arranged at a right angle to one another, with the result that the electrical conductors 10, 20 and 30 are also arranged orthogonally with respect to one another, and a reception of signals in all three spatial directions is made possible.

As becomes apparent with reference to FIG. 4, the magnetic core has, in the illustrated section, a large rectangular cross-sectional area which is illustrated by hatching in FIG.

4. In particular, the central section 110 of the magnetic core is embodied in a rectangular shape in a plan view. The electrical conductors 30 which are arranged along the side faces 112a, 112b of the central section 110 of the core, and the electrical conductors 30 which are arranged along the side faces 123 of the lateral sections 120a, 120b of the core, are therefore also wound in a rectangular shape around the core.

Despite the small height of the magnetic core in the z direction, the large cross section of the core permits the total volume of the core to be increased in the x and y directions. Owing to the rectangular cross-sectional shape of the magnetic core with a low height, which can be seen in FIGS. 3 and 4, the sensitivity of the component with respect to a round cross-sectional shape is improved by 20% to 30%. The voltage which is induced in the electrical conductors 10, 20 and 30 under a magnetic field effect is improved by approximately 30%. The Q factor of the antenna element is, for example, at 125 kHz, between 20 and 50 for the 6.75 mH type. The direct voltage resistance of the antenna component has, for example, for the 6.75 mH type, values between 50 ohms and 120 ohms.

The determination of the sensitivity of the antenna component as a function of the geometry of the magnetic core 100 will be explained below with reference to FIGS. 5A and 5B. FIG. 5A shows the magnetic core 100 with the length 1 and the cross-sectional area A. The sensitivity S of a coil can be calculated generally with the formula $S \sim \omega \cdot N \cdot A \cdot \mu_{\mathit{eff}}$, where N signifies the number of turns which is defined from the inductance, A signifies the cross-sectional area of the core and $\omega$ signifies the angular frequency. The effective permeability $\mu_{\mathit{eff}}$ can be determined as a function of the length 1 and the diameter D of the magnetic core using the diagram illustrated in FIG. 5B. Since the formula relationship specified above relates to a cylindrical core, an equivalent diameter $d_{\mathit{eff}}$ can be determined from the cross-sectional area A illustrated in FIG. 5A. By means of the length 1 and the equivalent diameter $d_{\mathit{eff}}$ it is possible to determine the permeability $d_{\mathit{eff}}$ of the core from the diagram in FIG. 5B. For the magnetic core 100, the ratio between the length 1 of the core and the cross-sectional area A of the central section 110 of the magnetic core is selected in such a way that the magnetic core has a sensitivity for the 6.75 mH type of, for example, between 65 and 85 mV/μT.

Figure 6:
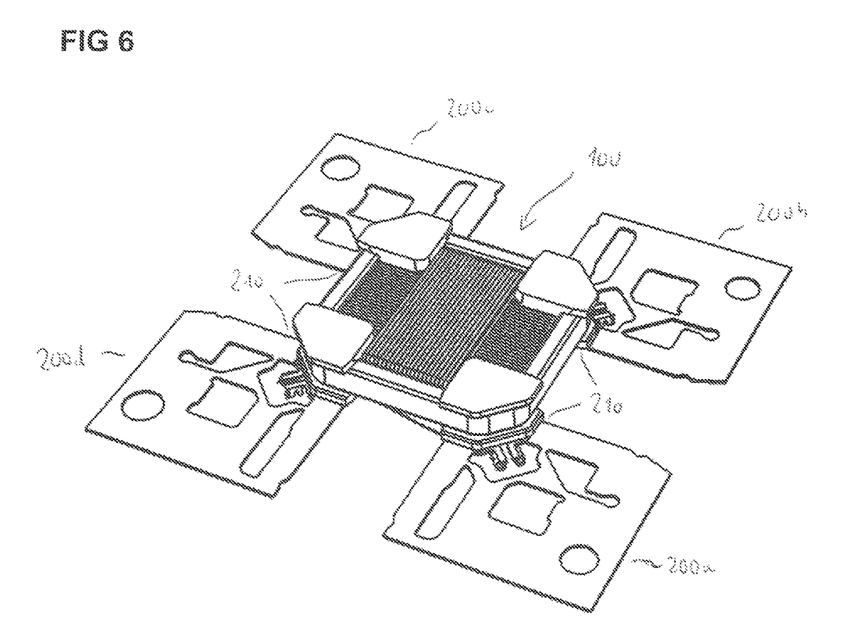
FIG. 6 shows an embodiment of a magnetic core, wound with electrical conductors, of an antenna component with a carrier elements.

FIG. 6 shows an embodiment of the magnetic core 100 which is wound with the electrical conductors 10, 20 and 30 which is attached to carrier elements 200a, 200b, 200c and 200d. The carrier elements may be, for example, part of a carrier strip. Each carrier element has on one of its edges a recess 210 which can be seen more clearly in the detail of FIGS. 7A and 7B. The projections 135 of the guide sections 130a, . . . , 130d are designed for insertion into the respective recess 210 of the carrier elements 200a, . . . , 200d. The projections 135 of the magnetic core 100 and the respective recess 210 of the carrier elements 200a, . . . , 200d are embodied, in particular, in such a way that after the insertion of the projections 135 into the respective recess 210 of the carrier elements 200a, . . . , 200d, the magnetic core 100 is oriented on the carrier elements. As a result, the magnetic core 100 may be arranged, for example, in a centered fashion with respect to the carrier elements 200a, . . . , 200d. Owing to the projections 135, the magnetic core can be oriented, in particular, with tight tolerance in an automated fashion with respect to the carrier elements 200a, . . . , 200d.

Figure 7A:
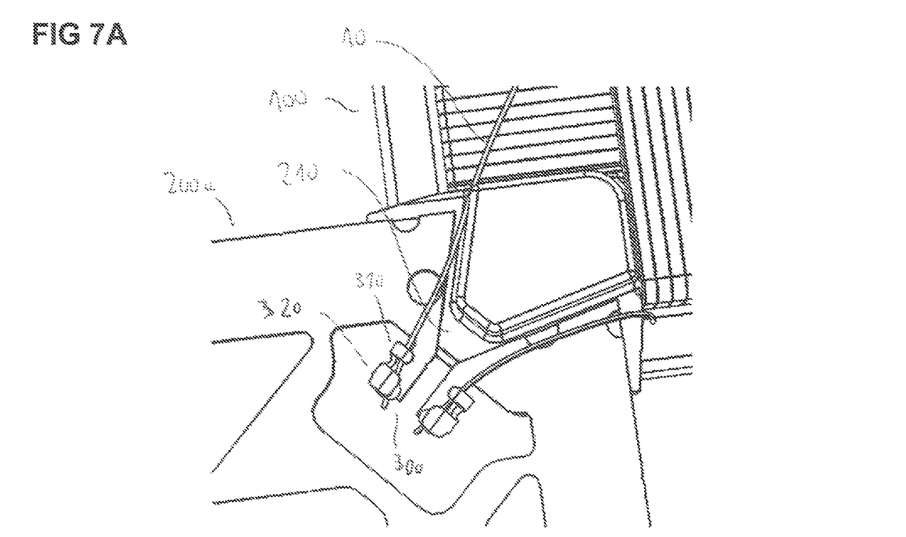
FIG. 7A shows an enlarged illustration of contact-forming means of an electrical conductor in a first embodiment of the antenna component with carrier elements.
Figure 7B:
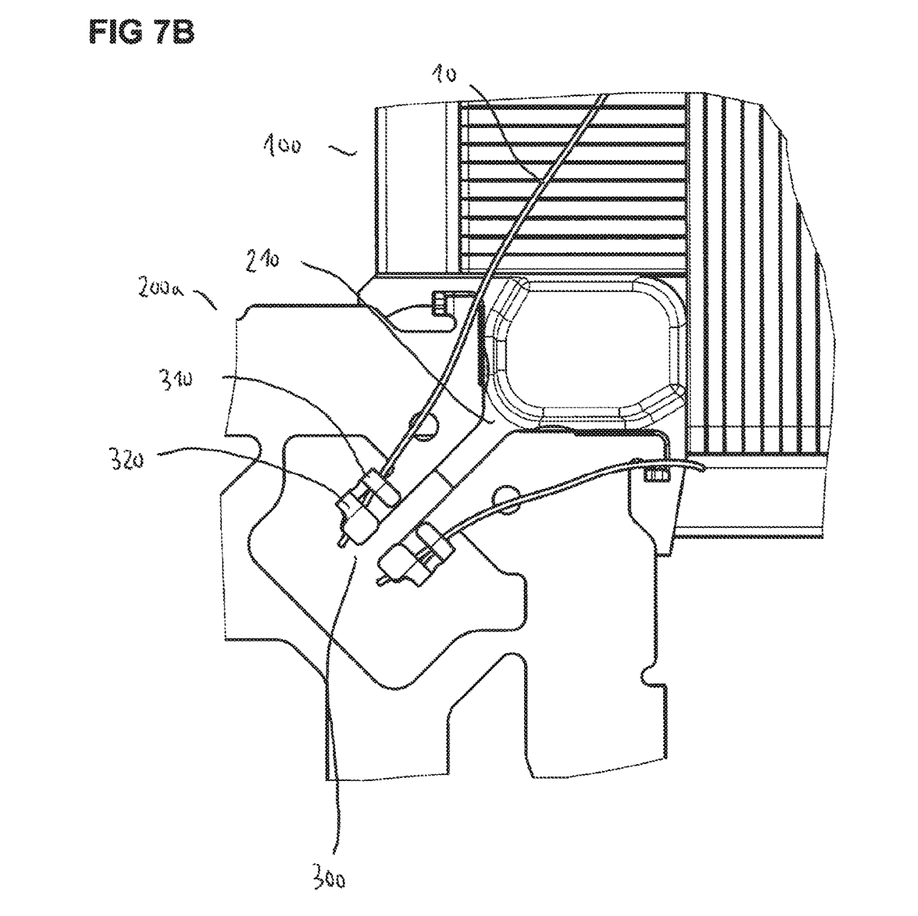
FIG. 7B shows an enlarged illustration of contact-forming means of an electrical conductor in a second embodiment of the antenna component with carrier elements.

FIGS. 7A and 7B show a detail of the arrangement of the magnetic core 100 and of the carrier element 200a illustrated in FIG. 6, in an enlarged view. FIG. 7A shows the magnetic core illustrated in FIG. 1A, and FIG. 7B shows the magnetic core shown in FIG. 1B. The magnetic core is inserted with one of its projections 135 into the recess 210 of the carrier element 200a. In order to form contact between the electrical conductors 10, 20 and 30 and the carrier elements, each carrier element 200a, . . . , 200d has connecting contacts 300. Each of the connecting contacts 300 can have a terminal device 310 for connecting one of the electrical conductors 10, 20, 30, and a contact-forming device 320 for forming electrical contact with the electrical conductor which has previously been connected to the terminal. In order to form electrical contact, one end of the electrical conductor is firstly clamped tightly in the clamping device 310 before the end of the electrical conductor is soldered or welded to the carrier element at the contact-forming device 320. The terminal device 310 is provided in the direct vicinity of the contact-forming device 320 of the connecting elements 300. As a result, electrical interruptions which frequently occur as a result of a wire break at the connecting contacts, at the antenna component can be largely avoided.

According to one preferred embodiment of the antenna component, the insulation of electrical conductor 10, 20 and 30 has a high-temperature-resistant material. The electrical conductors can be composed of a material which resists, for example, more than 20 cycles of a reflow soldering process with peak temperatures of up to 260° C. A material with a softening temperature higher than 350° C. for 0.05 mm or 0.25 mm according to IEC 60851.6.4 can be used for the electrical conductors. The insulation of the electrical conductor can contain, for example, a material made of polyamide-imide or can be composed completely of polyamide-imide.

The electrical conductors have a protective layer or insulating layer which is temperature-resistant to a temperature of 600° C. As a result, the protective layer of the electrical conductors cannot be removed in the case of soldering or welding to the carrier elements, with the result that short-circuits between the electrical conductors can be avoided. The removal of the insulation of electrical conductors is carried out mechanically or by means of laser technology.

Figure 8A:
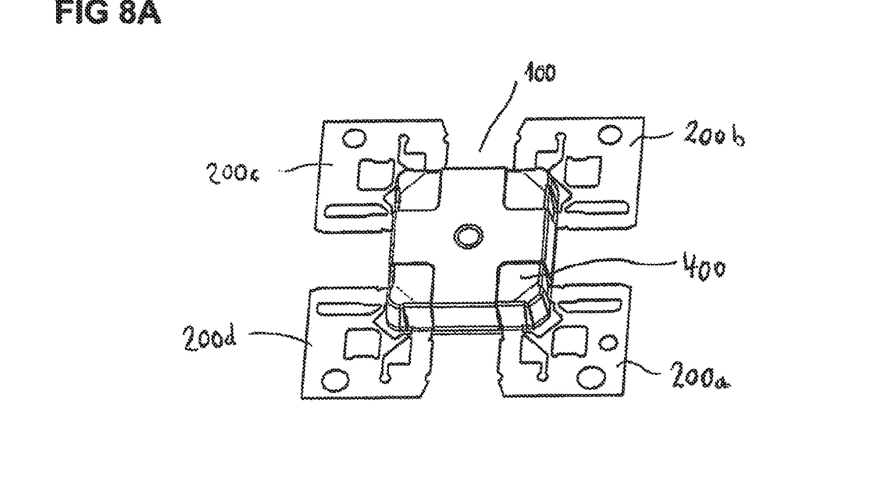
FIG. 8A shows an embodiment of an encapsulated magnetic core with attachment to carrier elements.

In order to finish the antenna component, the magnetic core 100 which is wound with the electrical conductors 10, 20 and 30 is surrounded with a casting material 400. FIG. 8A shows the magnetic core 100 which is arranged on the carrier elements 200a, . . . , 200d and which is surrounded and encapsulated by the casting material 400. The thin side walls 133, 134 of the guide sections 130a, . . . , 130d permit sufficient space to be available for casting with the casting material 400. The casting material 400 protects the magnetic core 100 and the electrical conductors surrounding it from mechanical stress.

Figure 8B:
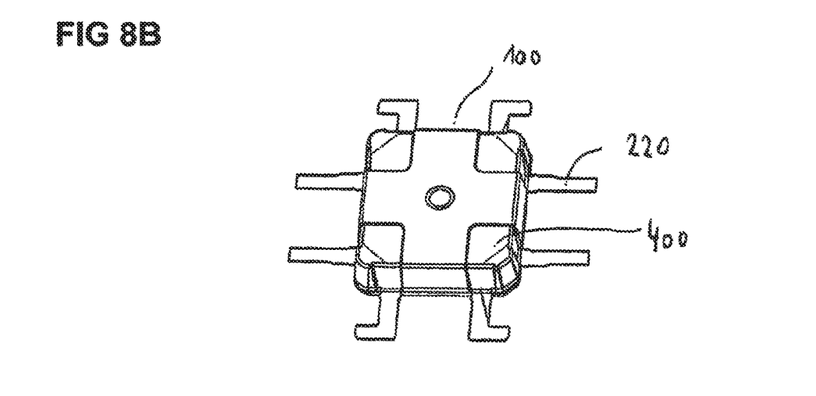
FIG. 8B shows an embodiment of an encapsulated magnetic core with contact elements which are punched out from the carrier elements.
Figure 8C:
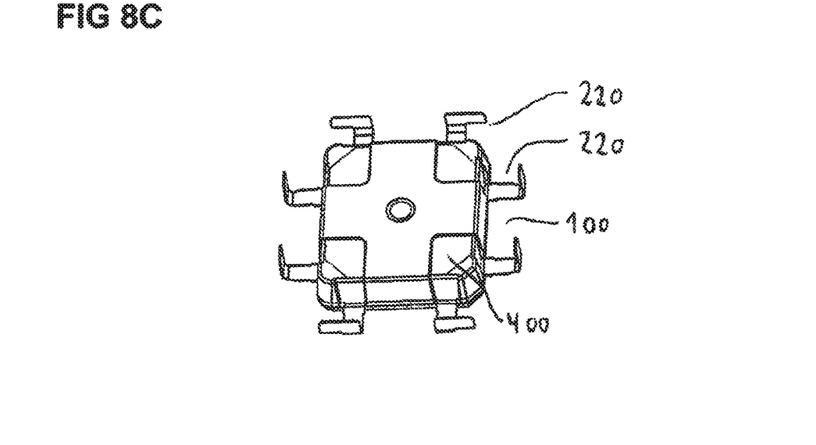
FIG. 8C shows an embodiment of an encapsulated magnetic core with bent contact elements.
Figure 9A:
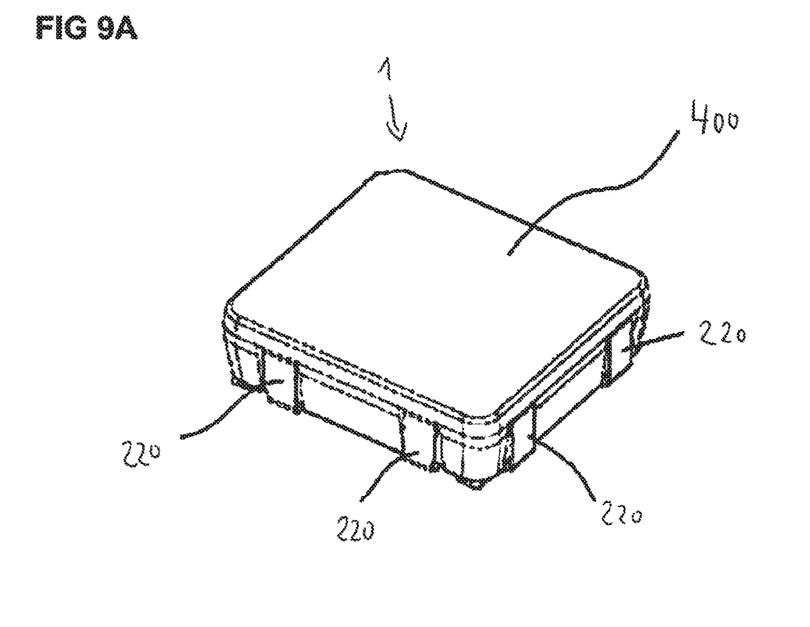
FIG. 9A shows a plan view of an upper side of an embodiment of an antenna component.
Figure 9B:
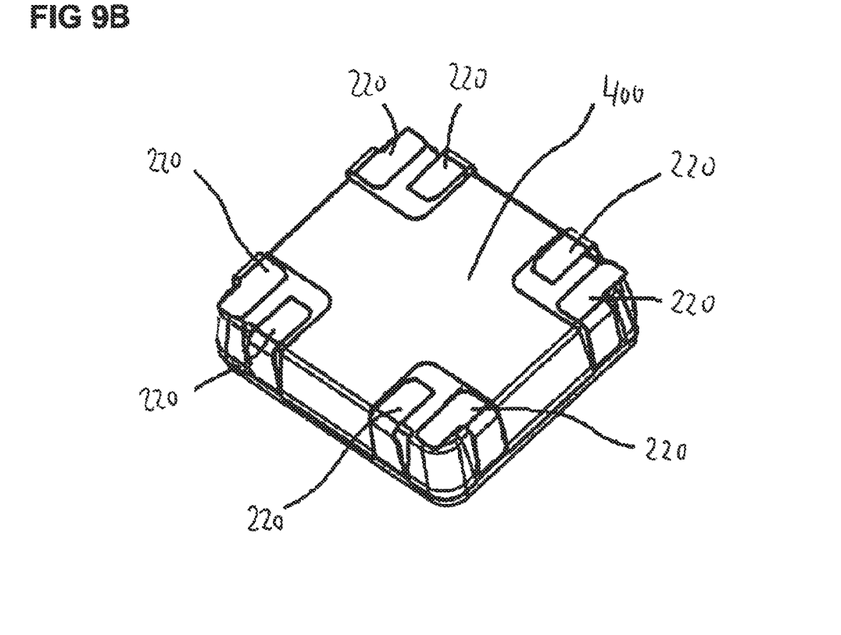
FIG. 9B shows a plan view of an underside of an embodiment of an antenna component.

In order to manufacture external contact connections or contact pins, corresponding contact elements are cut or punched out of the carrier elements. FIG. 8B shows the contact elements 220 which are cut out of the carrier elements. In order to permit suitable formation of external contacts, the contact elements are bent at their external ends, as illustrated in FIG. 8C. The contact-forming elements 220 are subsequently bent around the encapsulated core. The finished antenna component 1 is shown in FIG. 9A from an upper side and in FIG. 9B from an underside. The contact elements 220 make available conductive connecting faces for the formation of electrical contact on the underside of the cast magnetic core.

The invention claimed is:

1. An antenna component comprising:
   a first electrical conductor, a second electrical conductor and a third electrical conductor;
   a magnetic core integrally embodied; and
   at least one carrier element for attaching the magnetic core, wherein the at least one carrier element comprises a recess,
   wherein the magnetic core has a central cuboid section with an upper rectangular side face and a lower rectangular side face, each with first and second long sides and first and second short sides,
   wherein the first electrical conductor is wound directly around the central section of the magnetic core in such a way that the first electrical conductor runs parallel to the first and second long sides of the upper and lower side faces of the central section,
   wherein the magnetic core has a first lateral section and a second lateral section, wherein the first lateral section is arranged on a central part of the first long side of the upper and lower side faces of the central section, wherein the second lateral section is arranged on a central part of the second long side of the upper and lower side faces of the central section,
   wherein the second electrical conductor is wound directly around the first and second lateral sections of the magnetic core in such a way that the second electrical conductor is arranged over the first electrical conductor and runs orthogonally with respect to the first electrical conductor,
   wherein the magnetic core has a plurality of guide sections, each with a duct for guiding the third electrical conductor around the magnetic core,
   wherein the guide sections are embodied in such a way that the third electrical conductor runs orthogonally with respect to the first and second electrical conductors,
   wherein each duct has a base face and side walls arranged laterally,
   wherein a first sidewall of the side walls of each duct has a projection for inserting the projection into the recess of the at least one carrier element, and
   wherein the projection of the magnetic core and the recess of the at least one carrier element are embodied in such a way that after inserting the projection of the magnetic core into the recess of the at least one carrier element the magnetic core is oriented on the at least one carrier element.

2. The antenna component according to claim 1,
   wherein the central section has a first central side face and a second central side face, which central side faces are arranged between the short first and second sides of the upper and lower side faces of the central section, and
   wherein the first electrical conductor is wound directly around the upper side face, the lower side face and the first and second side faces of the central section of the magnetic core.

3. The antenna component according to claim 1,
   wherein the first and second lateral sections of the magnetic core each has an upper side face, a lower side face and a central side face arranged between them, and
   wherein the second electrical conductor is arranged directly on the upper, lower and central side faces of the first and second lateral sections.

4. The antenna component according to claim 3,
   wherein the upper side face of the central section of the magnetic core is arranged parallel to the upper side face of the lateral sections of the magnetic core,
   wherein the lower side face of the central section of the magnetic core is arranged parallel to the lower side face of the lateral sections of the magnetic core, and
   wherein a height of the magnetic core between the upper and lower side faces of the central section is less than a height of the magnetic core between the upper and lower side faces of the lateral sections.

5. The antenna component according to claim 2,
   wherein the plurality of guide sections are arranged at corners of the magnetic core between the first and second lateral sections of the magnetic core and the central side faces of the central section of the magnetic core, and
   wherein each of the guide sections has a duct shaped in such a way that the third electrical conductor is guided through the duct around the corners of the magnetic core.

6. The antenna component according to claim 5,
   wherein the third electrical conductor is arranged directly on each base face of the each duct of the guide sections, and
   wherein each base face of each duct is shaped in such a way that the third electrical conductor is guided along the respective central side face of the lateral sections of the magnetic core around the corners of the magnetic core and along the first and second central side faces of the central section of the magnetic core.

7. The antenna component according to claim 6, wherein each base face of each duct is arranged in a plane over the respective central side face of the lateral sections and over the first and second central side faces of the central section.

8. The antenna component according to claim 1, further comprising a plurality of connecting contacts for making contact between the first, second and third electrical conductors and the at least one carrier element, wherein each connecting contact has a terminal device for connecting one of the electrical conductors and a contact-forming device for forming electrical contact with one of the electrical conductors.

9. The antenna component according to claim 1, wherein the magnetic core and the electrical conductors are surrounded by a casting material.

10. The antenna component according to claim 1,
    wherein a second side wall of the side walls of each duct of the guide sections does not have a projection, and
    wherein a ratio of a height between the projection of the magnetic core and the second side wall of each of the guide sections and the height between the upper and lower side faces of the central section of the magnetic core is at least greater than 3.

11. The antenna component according to claim 1, wherein the first, second and third electrical conductors comprise a high-temperature-resistant material.

12. The antenna component according to claim 1, wherein edges between the side faces of the central section of the magnetic core and edges between the respective side faces of the lateral sections of the magnetic core are rounded.

13. The antenna component according to claim 1,
    wherein the magnetic core comprises a ferrite material with a density between 4600 kg/m$^3$ and 6000 kg/m$^3$ and a compressive strength between 200 N/mm$^2$ and 700 N/mm$^2$, and
    wherein the magnetic core has an $A_L$ value between 35 nH and 42 nH on at least one axle.

14. The antenna component according to claim 1, wherein the magnetic core is manufactured by an injection process.

15. An antenna component comprising:
a first electrical conductor, a second electrical conductor and a third electrical conductor;
a magnetic core for winding with the electrical conductors, wherein the magnetic core is integrally embodied;
at least one carrier element for attaching the magnetic core; and
a plurality of connecting contacts for contacting the first, second and third electrical conductors with the at least one carrier element,
wherein the magnetic core has a central cuboid section with an upper rectangular side face and a lower rectangular side face, each with a first and second long side and a first and second short side,
wherein the first electrical conductor is wound directly around the central section of the magnetic core in such a way that the first electrical conductor runs parallel to the first and second long sides of the upper and lower side faces of the central section of the magnetic core,
wherein the magnetic core has a first lateral section and a second lateral section, wherein the first lateral section is arranged on a central part of the first long side of the upper and lower side faces of the central section of the magnetic core, and the second lateral section is arranged on a central part of the second long side of the upper and lower side faces of the central section of the magnetic core,
wherein the second electrical conductor is wound directly around the first and second lateral sections of the magnetic core in such a way that the second electrical conductor is arranged over the first electrical conductor and runs orthogonally with respect to the first electrical conductor,
wherein the magnetic core has a plurality of guide sections, each guide section comprising a duct for guiding the third electrical conductor around the magnetic core, and wherein the guide sections are embodied in such a way that the third electrical conductor runs orthogonally with respect to the first and second electrical conductors.

16. An antenna component comprising:
a first electrical conductor, a second electrical conductor and a third electrical conductor; and
a magnetic core integrally embodied,
wherein the magnetic core has a central cuboid section with an upper rectangular side face and a lower rectangular side face, each with first and second long sides and first and second short sides,
wherein the first electrical conductor is wound directly around the central section of the magnetic core in such a way that the first electrical conductor runs parallel to the first and second long sides of the upper and lower side faces of the central section,
wherein the magnetic core has a first lateral section and a second lateral section, wherein the first lateral section is arranged on a central part of the first long side of the upper and lower side faces of the central section, wherein the second lateral section is arranged on a central part of the second long side of the upper and lower side faces of the central section,
wherein the second electrical conductor is wound directly around the first and second lateral sections of the magnetic core in such a way that the second electrical conductor is arranged over the first electrical conductor and runs orthogonally with respect to the first electrical conductor,
wherein the magnetic core has a plurality of guide sections, each with a duct for guiding the third electrical conductor around the magnetic core,
wherein the guide sections are embodied in such a way that the third electrical conductor runs orthogonally with respect to the first and second electrical conductors, and
wherein the first, second and third electrical conductors comprise a high-temperature-resistant material.

* * * * *